(12) United States Patent
Luo et al.

(10) Patent No.: US 9,394,430 B2
(45) Date of Patent: Jul. 19, 2016

(54) CONTINUOUS FIBER REINFORCED POLYARYLENE SULFIDE

(71) Applicant: Ticona LLC, Florence, KY (US)

(72) Inventors: Rong Luo, Florence, KY (US); Aaron Johnson, Winona, WI (US); Tim Tibor, Cincinnati, OH (US); Xinyu Zhao, Cincinnati, OH (US); David Eastep, Winona, MN (US)

(73) Assignee: Ticona LLC, Florence, KY (US)

( * ) Notice: Subject to any disclaimer, the term of this patent is extended or adjusted under 35 U.S.C. 154(b) by 61 days.

(21) Appl. No.: 13/800,130

(22) Filed: Mar. 13, 2013

(65) Prior Publication Data

US 2013/0273280 A1  Oct. 17, 2013

Related U.S. Application Data

(60) Provisional application No. 61/623,629, filed on Apr. 13, 2012.

(51) Int. Cl.
*C08K 7/06* (2006.01)
*B32B 5/12* (2006.01)
(Continued)

(52) U.S. Cl.
CPC ... *C08K 7/06* (2013.01); *B32B 5/12* (2013.01); *B32B 5/26* (2013.01); *B32B 5/28* (2013.01); *C08J 5/24* (2013.01); *B32B 2250/20* (2013.01); *B32B 2260/023* (2013.01); *B32B 2260/046* (2013.01); *B32B 2262/106* (2013.01);
(Continued)

(58) Field of Classification Search
CPC  B32B 5/12; B32B 2250/20; B32B 2260/023; B32B 2260/046; B32B 2262/106; C08K 7/06; C08J 5/042; C08J 5/24; C08G 75/029; Y10T 428/1352; Y10T 428/249942; Y10T 428/249945; Y10T 428/249946; Y10T 428/249947
USPC ............... 428/35.7, 298.1, 299.1, 299.7, 221, 428/297.4, 36.9, 36.91; 524/609
See application file for complete search history.

(56) References Cited

U.S. PATENT DOCUMENTS

| 2,729,404 | A | 4/1973 | Morgan |
| 3,725,362 | A | 4/1973 | Walker |

(Continued)

FOREIGN PATENT DOCUMENTS

| CN | 101126182 | 2/2008 |
| CN | 101768358 | 7/2010 |

(Continued)

*Primary Examiner* — Yan Lan
(74) *Attorney, Agent, or Firm* — Dority & Manning, P.A.

(57) ABSTRACT

A continuous fiber composite is described and methods for forming the continuous fiber composite. The continuous fiber composite includes a plurality of unidirectionally aligned continuous fibers embedded within a polyarylene sulfide polymer. The continuous fiber composite includes a very high loading of continuous fibers, for instance greater than about 40% by weight of the continuous fiber composite. The continuous fiber composite is formed by reacting a starting polyarylene sulfide with a reactively functionalized disulfide compound in a melt processing unit. Reaction between the starting polyarylene sulfide and the reactively functionalized disulfide compound leads to formation of a reactively functionalized polyarylene sulfide. Upon embedding of the continuous fibers into the reactively functionalized polyarylene sulfide, the reactivity of the polyarylene sulfide can enhance adhesion between the polyarylene sulfide polymer and the fibers.

18 Claims, 5 Drawing Sheets

(51) Int. Cl.
*B32B 5/26* (2006.01)
*B32B 5/28* (2006.01)
*C08J 5/24* (2006.01)

(52) U.S. Cl.
CPC ....... *B32B 2307/54* (2013.01); *B32B 2307/542* (2013.01); *B32B 2307/546* (2013.01); *B32B 2605/00* (2013.01); *C08J 2381/04* (2013.01); *Y10T 428/1352* (2015.01); *Y10T 428/249942* (2015.04); *Y10T 428/249945* (2015.04); *Y10T 428/249946* (2015.04); *Y10T 428/249947* (2015.04)

(56) References Cited

U.S. PATENT DOCUMENTS

| | | |
|---|---|---|
| 4,021,596 A | 5/1977 | Bailey |
| 4,119,617 A | 10/1978 | Hanyuda et al. |
| 4,276,397 A | 6/1981 | Froix |
| 4,279,060 A | 7/1981 | Wirth |
| 4,605,713 A | 8/1986 | Heitz et al. |
| 4,678,831 A | 7/1987 | Kawabata et al. |
| 4,760,128 A | 7/1988 | Ebert et al. |
| 4,769,424 A | 9/1988 | Takekoshi et al. |
| 4,820,801 A | 4/1989 | Inoue et al. |
| 4,874,658 A | 10/1989 | Sasaki et al. |
| 4,889,893 A | 12/1989 | Kobayashi et al. |
| 4,935,473 A | 6/1990 | Fukuda et al. |
| 4,952,624 A | 8/1990 | Kohler et al. |
| 5,015,703 A | 5/1991 | Takekoshi et al. |
| 5,015,704 A | 5/1991 | Takekoshi et al. |
| 5,024,876 A | 6/1991 | Bobsein et al. |
| 5,047,465 A | 9/1991 | Auerbach |
| 5,057,264 A | 10/1991 | Bier et al. |
| 5,068,312 A | 11/1991 | Dorf et al. |
| 5,070,127 A | 12/1991 | Auerbach |
| 5,086,128 A | 2/1992 | Heinz et al. |
| 5,122,578 A | 6/1992 | Han et al. |
| 5,151,458 A | 9/1992 | Heinz et al. |
| 5,182,334 A | 1/1993 | Chen, Sr. et al. |
| 5,213,889 A * | 5/1993 | Cogswell et al. ............. 428/332 |
| 5,218,043 A | 6/1993 | Kubota et al. |
| 5,227,427 A | 7/1993 | Serizawa et al. |
| 5,276,107 A | 1/1994 | Kim et al. |
| 5,283,119 A | 2/1994 | Shuttleworth et al. |
| 5,384,196 A | 1/1995 | Inoue et al. |
| 5,418,281 A | 5/1995 | Yung et al. |
| 5,436,300 A | 7/1995 | Kashiwadate et al. |
| 5,488,084 A | 1/1996 | Kadoi et al. |
| 5,504,141 A | 4/1996 | Collard et al. |
| 5,541,243 A | 7/1996 | Ohmura et al. |
| 5,652,287 A | 7/1997 | Sullivan et al. |
| 5,654,383 A | 8/1997 | Kohler et al. |
| 5,679,284 A | 10/1997 | Kurita |
| 5,780,583 A | 7/1998 | Lubowitz et al. |
| 5,959,071 A | 9/1999 | DeMoss et al. |
| 5,981,007 A | 11/1999 | Rubin et al. |
| 5,997,765 A | 12/1999 | Furuta et al. |
| 6,001,934 A * | 12/1999 | Yamanaka et al. ............. 525/383 |
| 6,010,760 A | 1/2000 | Miyazaki et al. |
| 6,025,440 A | 2/2000 | Scheckenbach et al. |
| 6,080,822 A | 6/2000 | Haubs et al. |
| 6,117,950 A | 9/2000 | Yamao et al. |
| 6,130,292 A | 10/2000 | Harwood et al. |
| 6,201,098 B1 | 3/2001 | Haubs et al. |
| 6,280,668 B1 | 8/2001 | Saito et al. |
| 6,317,314 B1 | 11/2001 | Kung et al. |
| 6,339,400 B1 | 1/2002 | Flint et al. |
| 6,476,106 B1 | 11/2002 | Murakami et al. |
| 6,547,184 B2 | 4/2003 | Nieberle |
| 6,608,136 B1 | 8/2003 | Dean et al. |
| 6,645,623 B2 | 11/2003 | Dean et al. |
| 6,699,946 B1 | 3/2004 | Lambla et al. |
| 6,730,378 B2 | 5/2004 | Matsuoka et al. |
| 6,793,847 B2 | 9/2004 | Maeda et al. |
| 6,830,792 B1 | 12/2004 | Matsuoka et al. |
| 6,832,968 B2 | 12/2004 | Swope |
| 6,875,517 B2 | 4/2005 | Bosshammer et al. |
| 6,889,719 B2 | 5/2005 | Watanabe et al. |
| 6,900,272 B2 | 5/2005 | Matsuoka et al. |
| 6,949,288 B2 * | 9/2005 | Hodge et al. ............... 428/370 |
| 6,960,628 B2 | 11/2005 | Matsuoka et al. |
| 7,115,312 B2 | 10/2006 | Matsuoka et al. |
| 7,118,691 B2 | 10/2006 | Elkovitch et al. |
| 7,169,887 B2 | 1/2007 | Papke |
| 7,235,612 B2 | 6/2007 | Kobayashi et al. |
| 7,254,934 B2 | 8/2007 | Wu |
| 7,271,769 B2 | 9/2007 | Asano et al. |
| 7,301,783 B2 | 11/2007 | Homer et al. |
| 7,303,822 B1 | 12/2007 | Matsuoka et al. |
| 7,385,806 B2 | 6/2008 | Liao |
| 7,462,672 B2 | 12/2008 | Kobayashi et al. |
| 7,469,734 B2 | 12/2008 | Zuigyou |
| 7,486,243 B2 | 2/2009 | Wulff et al. |
| 7,486,517 B2 | 2/2009 | Aapro et al. |
| 7,518,568 B2 | 4/2009 | Tracy et al. |
| 7,553,925 B2 | 6/2009 | Bojkova |
| 7,608,666 B2 | 10/2009 | Matsuoka et al. |
| 7,960,473 B2 | 6/2011 | Kobayashi et al. |
| 7,974,660 B2 | 7/2011 | Hsu et al. |
| 7,989,079 B2 | 8/2011 | Lee et al. |
| 8,005,429 B2 | 8/2011 | Conway et al. |
| 8,026,309 B2 | 9/2011 | Halahmi et al. |
| 8,044,142 B2 | 10/2011 | Akiyama et al. |
| 8,076,423 B2 | 12/2011 | Ishio et al. |
| 8,152,071 B2 | 4/2012 | Doherty et al. |
| 8,168,732 B2 | 5/2012 | Ajbani et al. |
| 8,258,242 B2 | 9/2012 | Hiroi et al. |
| 8,338,547 B2 | 12/2012 | Takahashi et al. |
| 8,367,210 B2 | 2/2013 | Naritomi et al. |
| 8,426,552 B2 | 4/2013 | Hinokimori et al. |
| 8,462,054 B2 | 6/2013 | Yang et al. |
| 2003/0050091 A1 | 3/2003 | Tsai et al. |
| 2004/0257283 A1 | 12/2004 | Asano et al. |
| 2005/0104190 A1 | 5/2005 | Mithal et al. |
| 2005/0269011 A1 | 12/2005 | Auerbach et al. |
| 2006/0257624 A1 | 11/2006 | Naritomi et al. |
| 2009/0011163 A1 | 1/2009 | Ajbani |
| 2009/0267266 A1 | 10/2009 | Lee et al. |
| 2009/0280347 A1 | 11/2009 | Yu |
| 2010/0048777 A1 | 2/2010 | Kodama et al. |
| 2010/0249342 A1 | 9/2010 | Unohara et al. |
| 2011/0037193 A1 * | 2/2011 | Takada et al. ................. 264/211 |
| 2011/0089792 A1 | 4/2011 | Casebolt et al. |
| 2011/0090630 A1 | 4/2011 | Bergeron et al. |
| 2011/0134012 A1 | 6/2011 | Yang et al. |
| 2011/0169700 A1 | 7/2011 | Degner et al. |
| 2011/0172876 A1 | 7/2011 | Kimoto et al. |
| 2012/0065361 A1 | 3/2012 | Konno et al. |
| 2012/0237714 A1 | 9/2012 | Nishikawa et al. |
| 2013/0035440 A1 | 2/2013 | Nishikawa et al. |
| 2013/0059976 A1 | 3/2013 | Matsuo et al. |
| 2013/0069001 A1 | 3/2013 | Luo et al. |
| 2013/0071638 A1 | 3/2013 | Luo et al. |
| 2013/0072629 A1 | 3/2013 | Luo et al. |
| 2013/0072630 A1 | 3/2013 | Luo et al. |
| 2013/0225771 A1 | 8/2013 | Kanomata et al. |
| 2013/0249357 A1 | 9/2013 | Luo et al. |

FOREIGN PATENT DOCUMENTS

| | | |
|---|---|---|
| CN | 102140233 | 8/2011 |
| CN | 102181156 | 9/2011 |
| CN | 102532898 | 7/2012 |
| DE | 3813919 | 11/1989 |
| DE | 3842946 | 6/1990 |
| DE | 3938422 | 5/1991 |
| DE | 4138906 | 6/1993 |
| EP | 0326888 | 8/1989 |
| EP | 0338115 | 10/1989 |
| EP | 0405135 | 1/1991 |
| EP | 0431410 | 6/1991 |
| EP | 0432561 | 6/1991 |
| EP | 0546185 | 6/1993 |

(56) References Cited

FOREIGN PATENT DOCUMENTS

| | | |
|---|---|---|
| EP | 0549977 | 7/1993 |
| EP | 0568945 | 11/1993 |
| JP | 03-231969 | 10/1991 |
| JP | 05-086266 A | 4/1993 |
| JP | 05-170907 A | 7/1993 |
| JP | 05-230371 A | 9/1993 |
| JP | 08-151518 A | 6/1996 |
| JP | 11-140315 A | 5/1999 |
| JP | 2980054 B | 11/1999 |
| JP | 3034335 B | 4/2000 |
| JP | 2001-172501 A | 6/2001 |
| JP | 3227729 B | 11/2001 |
| JP | 2004-182754 A | 7/2004 |
| JP | 3579957 B | 10/2004 |
| JP | 3601090 B | 12/2004 |
| JP | 3637715 B | 4/2005 |
| JP | 3800783 B | 7/2006 |
| JP | 2006-316207 A | 11/2006 |
| JP | 3867549 B | 1/2007 |
| JP | 2007-197714 A | 8/2007 |
| JP | 2007-277292 A | 10/2007 |
| JP | 4038607 B | 1/2008 |
| JP | 4129674 B | 8/2008 |
| JP | 4196647 B | 12/2008 |
| JP | 2009-256480 A | 11/2009 |
| JP | 2009-263635 A | 11/2009 |
| JP | 2010-053356 A | 3/2010 |
| JP | 2010-084125 A | 4/2010 |
| JP | 4495261 B | 6/2010 |
| JP | 2010-195874 A | 9/2010 |
| JP | 4552315 B | 9/2010 |
| JP | 4943399 B | 5/2012 |
| JP | 5029881 B | 9/2012 |
| JP | 2013-112783 | 6/2013 |
| WO | 2009/033349 | 3/2009 |

* cited by examiner

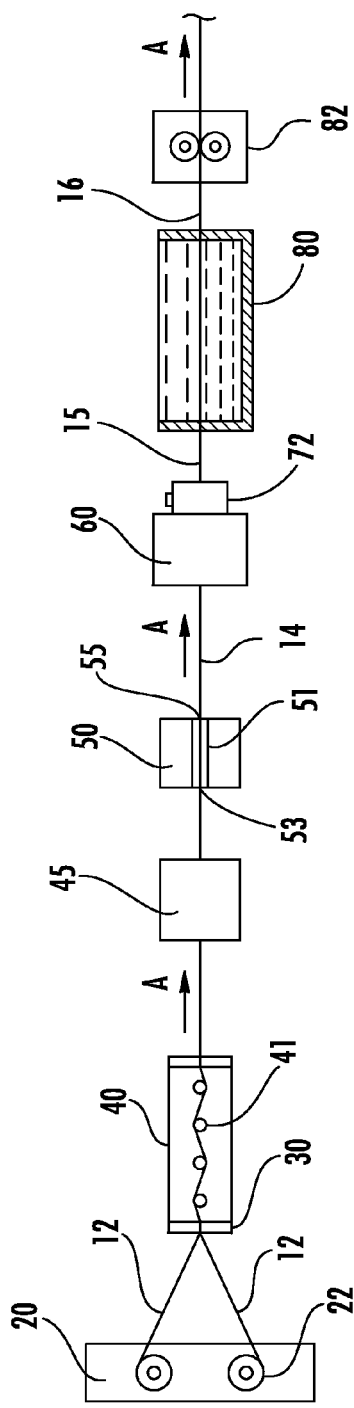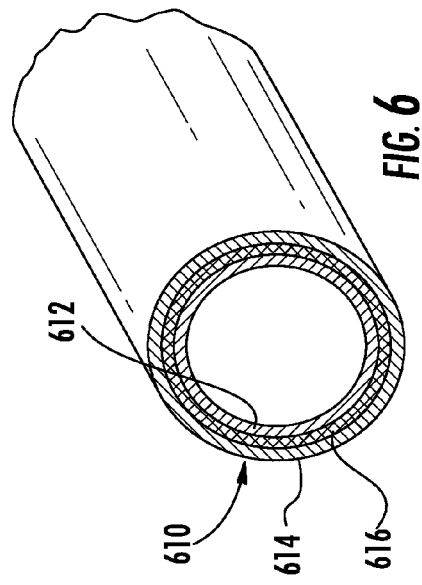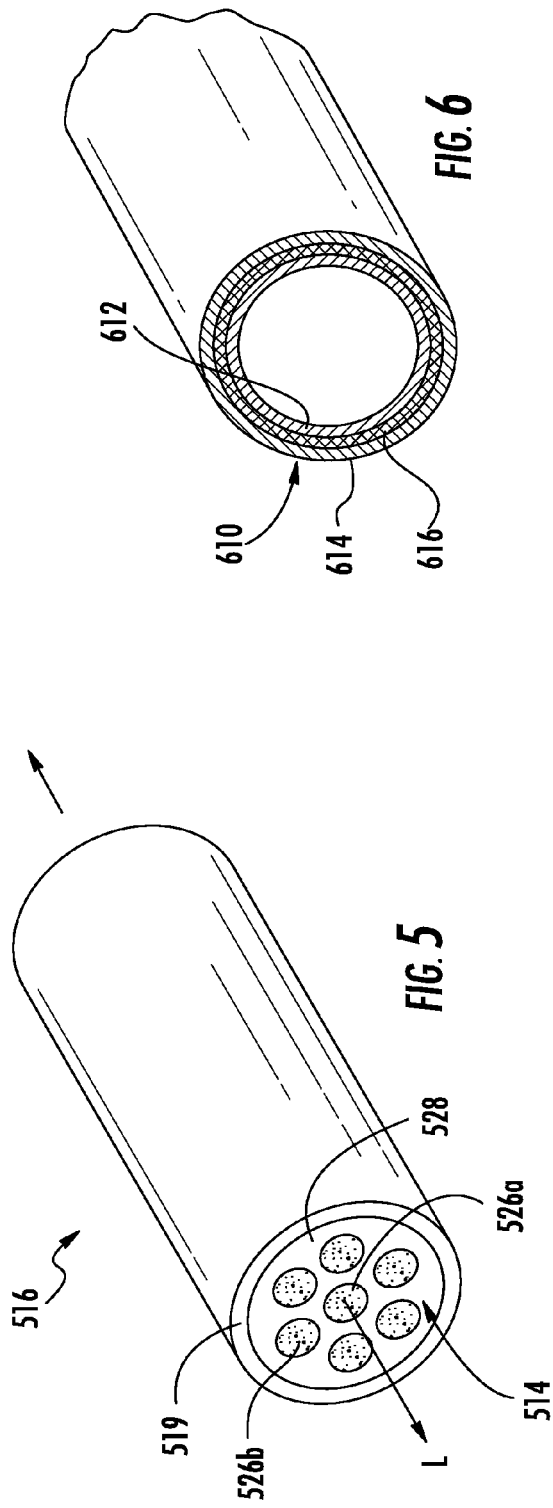

ial Patent Application Ser. No. 61/623,629 having a
CONTINUOUS FIBER REINFORCED POLYARYLENE SULFIDE

CROSS REFERENCE TO RELATED APPLICATION

The present application claims filing benefit of U.S. Provisional Patent Application Ser. No. 61/623,629 having a filing date of Apr. 13, 2012, which is incorporated herein in its entirety.

BACKGROUND OF THE INVENTION

Continuous fiber/polymer composites have been employed in a wide variety of applications. For example, continuous fiber composites have been used to form fiber reinforced composite tapes, ribbons, rods and profiles useful as lightweight structural reinforcements as well as protective casings. Continuous fiber composites have also been utilized in melt processing techniques such as injection molding for formation of products exhibiting high strength characteristics in a variety of desirable applications.

A significant problem with continuous fiber composites is that they often rely upon thermoset resins (e.g., vinyl esters) to help achieve the desired strength properties. Thermoset resins are difficult to use during manufacturing and do not possess good bonding characteristics for forming composites with other materials. In response, attempts have been made to form continuous fiber composites with thermoplastic resins. Unfortunately, these continuous fiber composites exhibit flaws and dry spots due to inadequate wetting of the fibers, which results in poor durability and strength in the formed products. Another problem with such continuous fiber composites is that the thermoplastic resins utilized often cannot withstand high temperature processing and/or applications.

In an attempt to alleviate such problems, polyarylene sulfides have been examined as a thermoplastic matrix for use in forming continuous fiber composites. Polyarylene sulfides are high-performance polymers that may withstand high thermal, chemical, and mechanical stresses and are beneficially utilized in a wide variety of applications. A significant problem with polyarylene sulfide-based continuous fiber composites however is that they typically suffer from poor consolidation due to poor adhesion between the polyarylene sulfide polymer and the continuous fiber, particularly when utilizing continuous carbon fibers. Use of high molecular weight polyarylene sulfides has shown promise in forming continuous fiber composites as the high molecular weight polyarylene sulfide is understood to have better adhesion with the continuous fiber due to higher levels of intermolecular chain entanglement. Unfortunately, high molecular weight polyarylene sulfides have high melt viscosity, and this presents processibility issues that may complicate formation techniques. In response, loading levels of continuous fibers in the composites have been limited so as to balance processibility of the materials with desired mechanical properties of the formed continuous fiber composites.

A need currently exists for a continuous fiber composite that is formed from a polyarylene sulfide polymer and includes a high continuous fiber loading level. Useful composites will be capable of achieving the desired strength, durability, and temperature performance demanded by desired applications while exhibiting good processibility characteristics during formation.

SUMMARY OF THE INVENTION

In accordance with one embodiment, a polyarylene sulfide-based continuous fiber composite is disclosed that extends in a longitudinal direction. The continuous fiber composite contains a plurality of continuous fibers oriented in the longitudinal direction and a reactively functionalized polyarylene sulfide that embeds the continuous fibers. The continuous fibers constitute greater than about 40% by weight of the continuous fiber composite.

In accordance with another embodiment, a method for forming a continuous fiber composite is disclosed. The method comprises melt processing a starting polyarylene sulfide with a reactively functionalized disulfide compound that includes reactive moieties to form a reactively functionalized polyarylene sulfide. The method also includes embedding a plurality of continuous fibers within a material that includes the reactively functionalized polyarylene sulfide to form the continuous fiber composite, wherein the continuous fibers are oriented substantially in a longitudinal direction in the continuous fiber composite. The continuous fibers constituting greater than about 40% by weight of the continuous fiber composite.

Also disclosed are products incorporating a continuous fiber composite that includes a plurality of continuous fibers. Products can include, for example, composite tapes, ribbons, sheets, rods, profiles, and components formed via injection molding, blow molding, thermoforming, hot stamping, and so forth.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 4 is a schematic illustration of one embodiment of a forming system that may be employed as described herein.

FIG. 5 is a perspective view of one embodiment of a continuous fiber reinforced polyarylene sulfide rod as may be formed as described herein.

FIG. 6 is a multi-layer tubular member, one or more layers of which may be formed from the polyarylene sulfide composition.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a continuous fiber composite for use in a variety of applications and methods of forming the continuous fiber composite. Continuous fiber composites can advantageously be utilized in formation of products according to melt processing techniques. Products can include, for example, composite pellets, tapes, ribbons, sheets, rods and profiles, for instance as may be utilized in forming electrical cables (e.g., high voltage transmission cables), power umbilicals, reinforced pipes, tethers, ropes, sporting goods, and a wide variety of other structural members.

Figure 1:
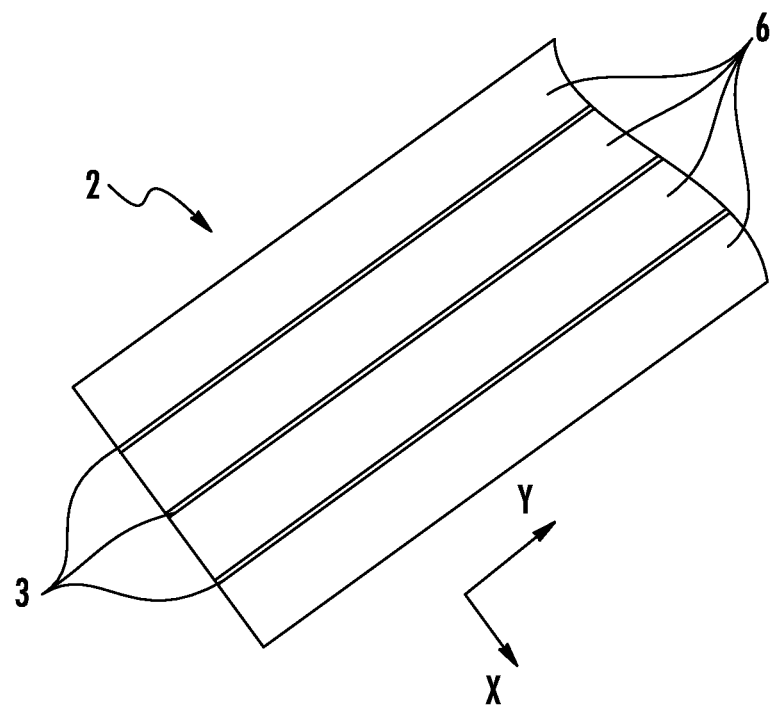
FIG. 1 is a perspective view of one embodiment of a continuous fiber composite as described herein.

The continuous fiber composite includes a plurality of continuous fibers embedded in a polyarylene sulfide polymer material. One embodiment of a continuous fiber composite is illustrated in FIG. 1. As can be seen, the continuous fiber composite 2 includes a plurality of unidirectionally aligned fibers 3 embedded within the polyarylene sulfide polymer material 6. The continuous fiber composite includes a very high loading of continuous fibers, generally greater than about 40% by weight of the continuous fiber composite. To achieve the high continuous fiber loading level, a starting polyarylene sulfide is reacted in a melt processing unit with a reactively functionalized disulfide compound. Reaction between the starting polyarylene sulfide and the reactively functionalized disulfide compound leads to formation of a reactively functionalized polyarylene sulfide. Upon embedding of the continuous fibers into a polymeric material including the reactively functionalized polyarylene sulfide, the reactivity of the polyarylene sulfide can enhance adhesion between the polyarylene sulfide polymer and the fibers. Without being bound by any particular theory, it is believed that the enhanced adhesion is due to improved bonding between the polyarylene sulfide and the surface of the fiber, e.g., bonding between functional groups present in the sizing on the surface of the continuous fiber and the reactive functionality of the polyarylene sulfide.

Reaction of the reactively functionalized disulfide compound with the starting polyarylene sulfide during melt processing can also lower the melt viscosity of the reactively functionalized polyarylene sulfide thus formed. For instance, the reactively functionalized polyarylene sulfide can have a melt viscosity of less than about 1500 poise, less than about 1000 poise, less than about 500 poise, or less than about 400 poise as determined in accordance with ISO Test No. 11443 at a shear rate of 1200 $s^{-1}$ and at a temperature of 310° C.

In one embodiment, the starting polyarylene sulfide can be a high molecular weight, low chlorine content polyarylene sulfide, and the resulting reactively functionalized polyarylene sulfide as well as the continuous fiber composite formed therefrom can not only exhibit a relatively low melt viscosity and resulting good processability, but can also have a low chlorine content. For instance, the polyarylene sulfide material of the continuous fiber composite can have a chlorine content of less than about 1000 parts per million (ppm), less than about 900 ppm, less than about 600 ppm, or less than about 400 ppm.

The continuous fiber composite can exhibit excellent mechanical characteristics due to interaction between the continuous fibers and the reactively functionalized polyarylene sulfide in the melt. Notably, the desired strength properties may be achieved without the need for additional different fiber types in the composite. By way of example, a continuous fiber composite tape can exhibit a tape tensile stress greater than about 2140 megapascals (MPa) (about 310×10$^3$ psi) or greater than about 2205 M (320×10$^3$ psi) and a tape tensile modulus of greater than about 117×10$^3$ MPa (17×10$^6$ psi). A continuous fiber tape can exhibit a percent strain at peak load of about 1.7% or less, for instance less than about 1.6%, and can exhibit a tensile chord modulus of greater than about 110×10$^3$ MPa (16.0×10$^6$ psi), or greater than about 117×10$^3$ MPa (17×10$^6$ psi), in one embodiment.

A continuous fiber composite panel (i.e., a laminate including a plurality (at least two) of continuous fiber tapes adjacent to one another) can have a tensile stress of greater than about 2050 MPa (300×10$^3$ psi), or greater than about 2200 MPa (320×10$^3$ psi). The composite panel can have a percent strain at peak load of about 1.8% and can have a tensile strength of greater than about 2065 MPa (300×10$^3$ psi), for instance greater than about 2100 MPa (305×10$^3$ psi). The continuous fiber composite panel can have a tensile chord modulus of greater than about 100×10$^3$ MPa (15×10$^6$ psi), for instance greater than about 110×10$^3$ MPa (16×10$^6$ psi).

Tape and panel tensile characteristics may be determined according to ASTM testing method number D3039/D3039M-08.

A continuous fiber composite panel can have a flexural stress of greater than about 1100 MPa (about 170×10$^3$ psi), or greater than about 1200 MPa (175×10$^3$ psi). The continuous fiber composite panel can have a maximum flexural load of greater than about 620 N (140 lb-f), or greater than about 645 N (145 lb-f), in one embodiment, and can have a flexural strain of less than about 1.2%, or less than about 1.15%. The continuous fiber composite panel can have a flexural chord modulus of greater than about 100×10$^3$ MPa (15×10$^6$ psi), or greater than about 117×10$^3$ MPa (17×10$^6$ psi), in one embodiment. Flexural properties can be determined according to ASTM Standard Test Method No. D790-03.

A continuous fiber composite can have a short beam shear strength greater than about 415×10$^3$ MPa (60×10$^6$ psi), or greater than about 480×10$^3$ MPa (70×10$^6$ psi) and can have a short beam peak stress of greater than about 65 MPa (10×10$^3$ psi) as measured according to Standard Test Method No. ASTM D2344.

The continuous fiber incorporated in the continuous fiber composite can be any suitable fiber type including, without limitation, 1) inorganic crystals or polymers, such as fibrous glass, quartz fibers, silica fibers and fibrous ceramics, which include alumina-silica (refractory ceramic fiber), boron fibers, silicon carbide fibers or monofilament metal oxide fibers, including alumina-boria-silica, alumina-chromia-silica, zirconia-silica, and the like; 2) organic polymer fibers, such as fibrous carbon, fibrous graphite, acetates, acrylics (including acrylonitriles), aliphatic polyamides (e.g., nylons), aromatic polyamides, polyesters, flax, polyethylenes, polyurethanes (e.g., spandex), alpha-cellulose, cellulose, regenerated cellulose (e.g., rayon), jutes, sisals, vinyl chlorides, e.g., vinyon, vinyldienes (e.g., saran) and thermoplastic fibers; 3) metal fibers, such as aluminum, boron, bronze, chromium, nickel, stainless steel, titanium and their alloys; and 4) "Whiskers" which are single, inorganic crystals.

As inorganic continuous fibers, there may be listed, for instance, fibers formed from glass such as hard glass fibers;

fibers formed from quartz such as molten quartz fibers; fibers derived from naturally-occurring minerals such as rock wool; fibers formed from metals; and fibers formed from carbon. The inorganic fibers may be used alone or in combination. It is also possible to use fibers obtained by forming any combination of the foregoing inorganic materials into fibers.

As organic continuous fibers, there may be listed, for instance, fibers formed from polyamide resins, in particular, those prepared from complete aromatic fibers such as aramid, e.g., Kevlar®; and fibers formed from polyester resins, in particular, those formed from complete aromatic fibers and polyimide resins. The organic fibers may be used alone or in combination. Moreover, it is also possible to use fibers formed from a polyarylene sulfide resin composition for forming a continuous fiber as may be incorporated in the composite.

A combination of organic and inorganic fibers may also be incorporated in the continuous fiber composite.

When utilizing an organic continuous fiber, the organic fiber material should be selected in such a manner that the resin from which the continuous fiber is formed has a melting point (or thermal decomposition temperature) higher than that of the polyarylene sulfide composition to be combined with the continuous fiber in order to prevent any damage to the shape of the continuous fibers present in the continuous fiber composite.

In one embodiment, the continuous fiber of the composite can include continuous carbon fiber. The carbon fiber incorporated into the continuous fiber composite can be any continuous carbon fiber as in known in the art including, without limitation, amorphous carbon fibers, graphitic carbon fibers, metal-coated carbon fibers, or mixtures thereof.

Figure 2:
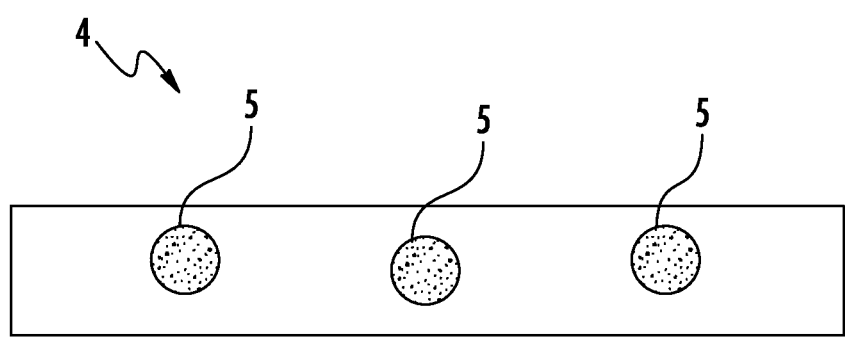
FIG. 2 is a cross-sectional view of a composite tape including a continuous fiber composite formed with continuous fiber rovings.

The continuous fibers can be in the form of individual fibers or in the form of fiber rovings. As used herein, the term "roving" generally refers to a bundle or tow of individual fibers. The fibers contained within the roving can be twisted or can be straight. The number of fibers contained in each roving can be constant or vary from roving to roving. Typically, a roving contains from about 1,000 fibers to about 100,000 individual fibers, and in some embodiments, from about 5,000 to about 50,000 fibers. For example, FIG. 2 illustrates a cross sectional view of a composite tape 4 that includes a plurality of continuous fiber ravings 5.

The continuous fibers employed can possess a high degree of tensile strength relative to their mass. For example, the ultimate tensile strength of continuous carbon fibers is typically from about 1,000 to about 10,000 Megapascals ("MPa"), in some embodiments from about 2,000 MPa to about 8,000 MPa, and in some embodiments, from about 3,000 MPa to about 7,000 MPa. Such tensile strengths may be achieved even though the fibers are of a relatively light weight, such as a mass per unit length of from about 0.1 to about 2 grams per meter, in some embodiments from about 0.4 to about 1.5 grams per meter. The ratio of tensile strength to mass per unit length may thus be about 1,000 megapascals per gram per meter ("MPa/g/m") or greater, in some embodiments about 4,000 MPa/g/m or greater. For instance, the continuous fibers can have a tensile strength to mass ratio in the range of from about 5,000 to about 7,000 MPa/g/m. The continuous fibers can have a nominal diameter of about 4 to about 35 micrometers, and in some embodiments, from about 5 to about 35 micrometers.

A melt processing device can be employed to form the reactively functionalized polyarylene sulfide and to embed the continuous fibers within a material including the reactively functionalized polyarylene sulfide. Among other things, the melt processing device facilitates the ability of the reactively functionalized polyarylene sulfide polymer material to be applied to the entire surface of the fibers and/or ravings.

Figure 3:
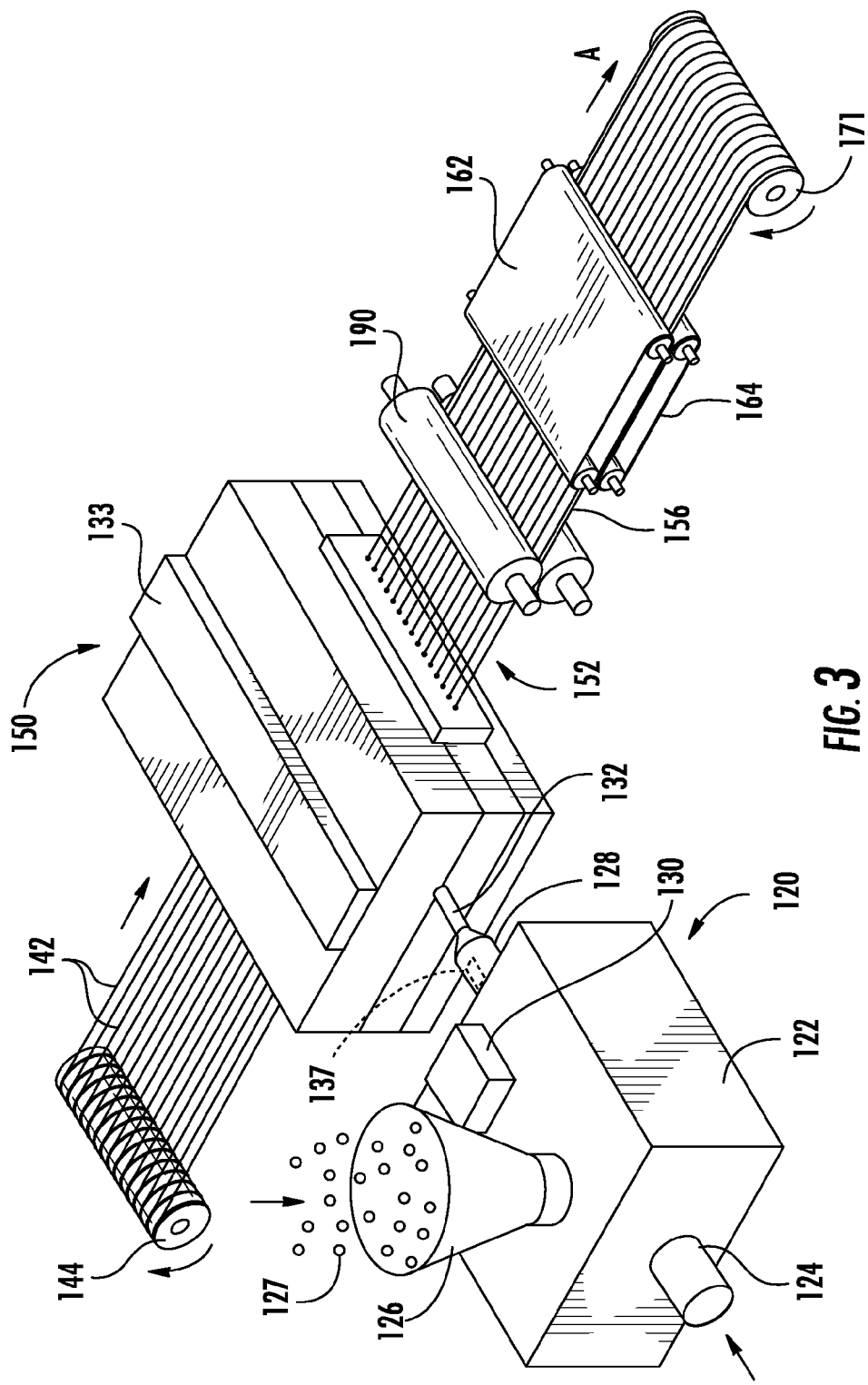
FIG. 3 is a schematic illustration of one embodiment of an impregnation system for use as described herein.
Figure 8:
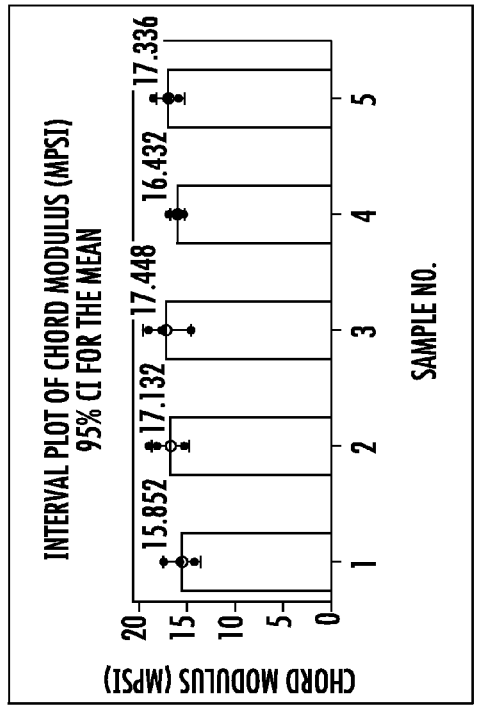
FIG. 8 illustrates a tensile modulus comparison for several composite tapes incorporating carbon fibers.
Figure 10:
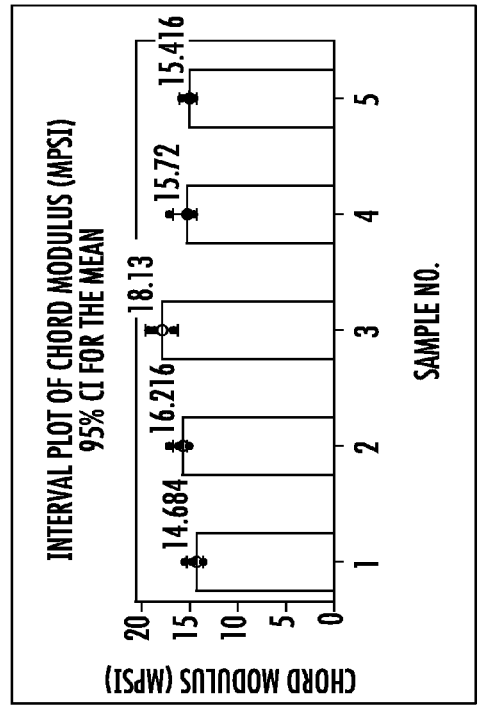
FIG. 10 illustrates a tensile modulus comparison for several composite panels incorporating carbon fibers.
Figure 7:
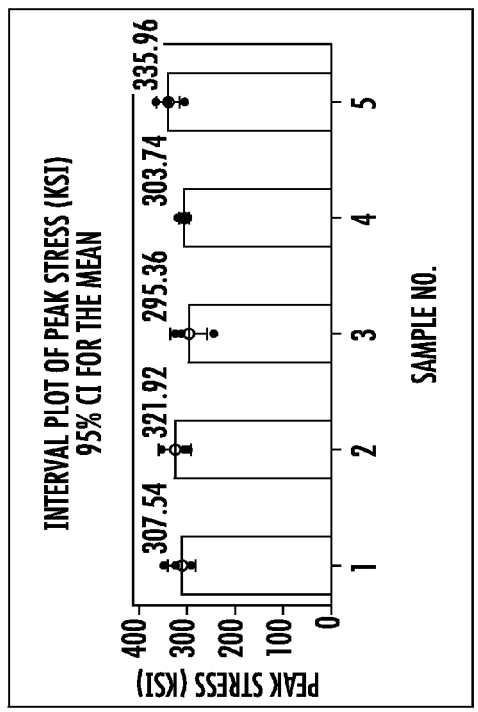
FIG. 7 illustrates a tensile stress comparison for several composite tapes incorporating carbon fibers.
Figure 9:
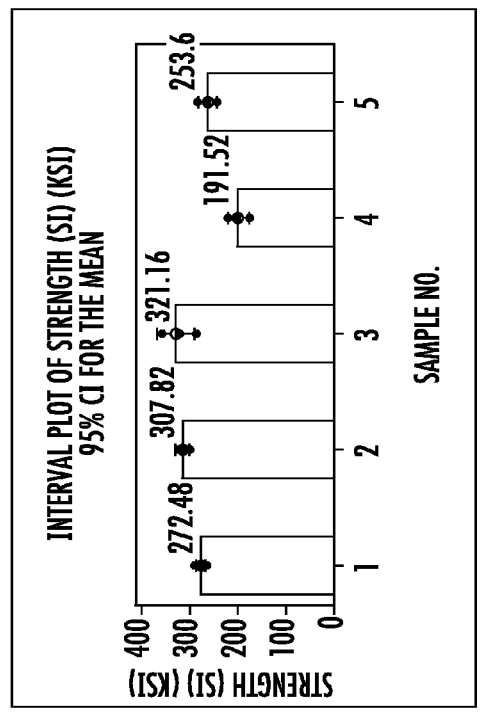
FIG. 9 illustrates a tensile stress comparison for several composite panels incorporating carbon fibers.
Figure 12:
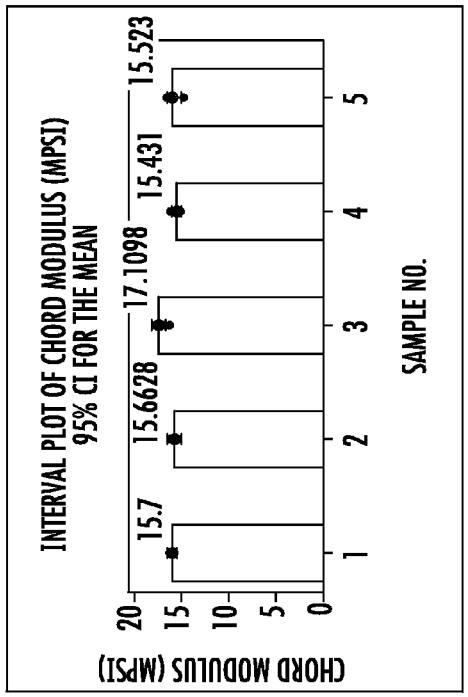
FIG. 12 illustrates a flexural modulus comparison for several composite panels incorporating carbon fibers.
Figure 14:
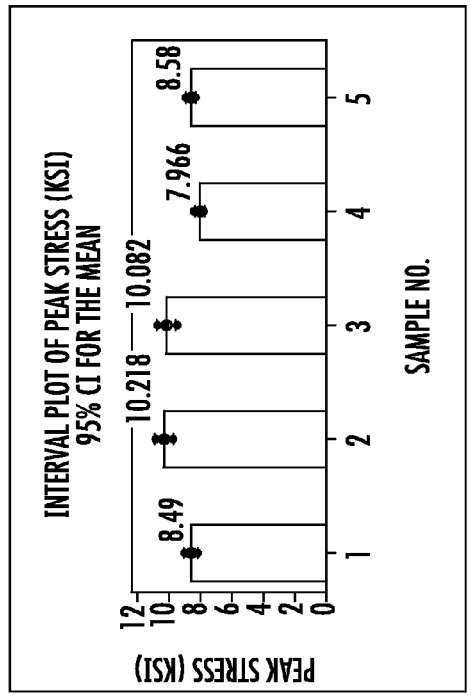
FIG. 14 illustrates a short beam peak stress comparison for several composite panels incorporating carbon fibers.
Figure 11:
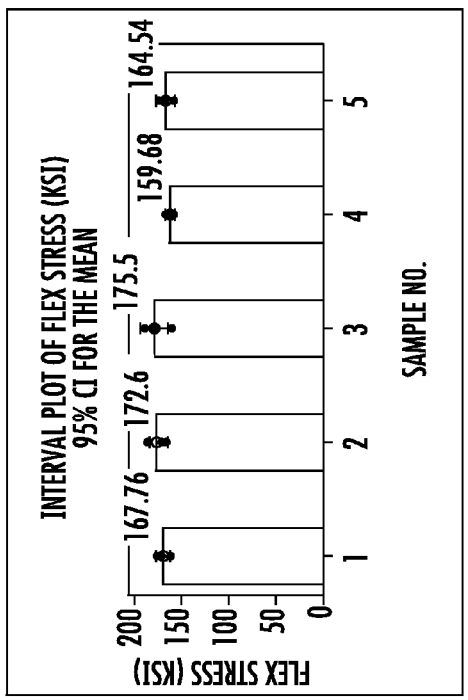
FIG. 11 illustrates a flexural stress comparison for several composite panels incorporating carbon fibers.
Figure 13:
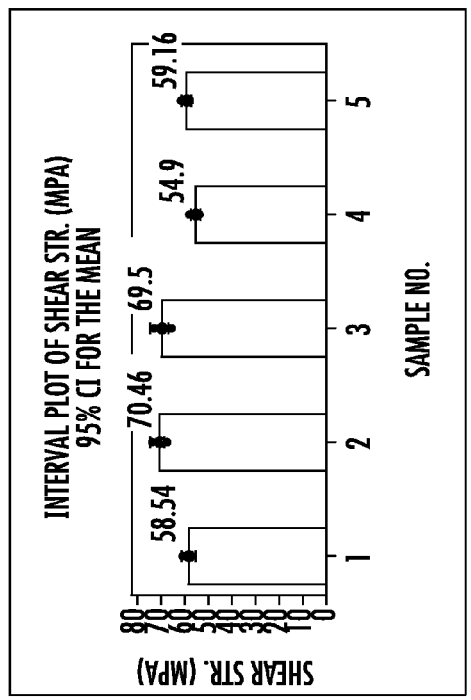
FIG. 13 illustrates a short beam shear strength comparison for several composite panels incorporating carbon fibers.

Referring to FIG. 3, one embodiment of such melt processing device is shown. More particularly, the apparatus includes an extruder 120 containing a screw shaft 124 mounted inside a barrel 122. A heater 130 (e.g., electrical resistance heater) is mounted outside the barrel 122. During use, a feedstock 127 including the starting polyarylene sulfide and a reactively functionalized disulfide compound are supplied to the extruder 120 through a hopper 126.

The feedstock 127 includes the starting polyarylene sulfide. In general, the starting polyarylene sulfide may be a polyarylene thioether containing repeat units of the formula (I):

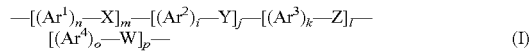

$$—[(Ar^1)_n—X]_m—[(Ar^2)_i—Y]_j—[(Ar^3)_k—Z]_l— \\ [(Ar^4)_o—W]_p— \qquad (I)$$

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the starting polyarylene sulfide is a polyphenylene sulfide, defined herein as containing the phenylene sulfide structure —$(C_6H_4—S)_n$— (wherein n is an integer of 1 or more) as a component thereof.

The starting polyarylene sulfide may be synthesized prior to formation of the continuous fiber composite, though this is not a requirement of a process. Synthesis techniques that may be used in making a polyarylene sulfide are generally known in the art. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

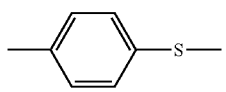
(II)

and segments having the structure of formula (III):

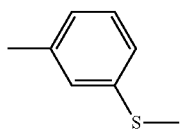
(III)

or segments having the structure of formula (IV):

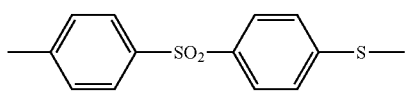
(IV)

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Following polymerization, the starting polyarylene sulfide may be washed with liquid media. For instance, the polyarylene sulfide may be washed with water, acetone, N-methyl-2-pyrrolidone, a salt solution, and/or an acidic media such as acetic acid or hydrochloric acid. The polyarylene sulfide can be washed in a sequential manner that is generally known to persons skilled in the art. Washing with an acidic solution or a salt solution may reduce the sodium, lithium or calcium metal ion end group concentration from about 2000 ppm to about 100 ppm.

Organic solvents that will not decompose the polyarylene sulfide can be used for washing. Organic solvents can include, without limitation, nitrogen-containing polar solvents such as N-methylpyrrolidone, dimethylformamide, dimethylacetamide, 1,3-dimethylimidazolidinone, hexamethylphosporamide, and piperazinone; sulfoxide and sulfone solvents such as dimethyl sulfoxide, dimethylsulfone, and sulfolane; ketone solvents such as acetone, methyl ethyl ketone, diethyl ketone, and acetophenone, ether solvents such as diethyl ether, dipropyl ether, dioxane, and tetrahydrofuran; halogen-containing hydrocarbon solvents such as chloroform, methylene chloride, ethylene dichloride, trichloroethylene, perchloroethylene, monochloroethane, dichloroethane, tetrachloroethane, perchloroethane, and chlorobenzene; alcohol and phenol solvents such as methanol, ethanol, propanol, butanol, pentanol, ethylene glycol, propylene glycol, phenol, cresol, polyethylene glycol, and polypropylene glycol; and aromatic hydrocarbon solvents such as benzene, toluene, and xylene. Further, solvents can be used alone or as a mixture of two or more thereof.

It should be understood that formation of the starting polyarylene sulfide is not a requirement, and a starting polyarylene sulfide can also be purchased from known suppliers. For instance Fortron® polyphenylene sulfide available from Ticona of Florence, Ky., USA can be purchased and utilized as the starting polyarylene sulfide.

A continuous fiber composite may include a polyarylene sulfide (or a blend of multiple polyarylene sulfides) in an amount from about 2% to about 60% by weight of the composite, for instance from about 5% to about 40% by weight of the composite.

A starting polyarylene sulfide may have a relative high molecular weight. For instance a starting polyarylene sulfide may have a number average molecular weight greater than about 25,000 g/mol, or greater than about 30,000 g/mol, and a weight average molecular weight greater than about 60,000 g/mol, or greater than about 65,000 g/mol. A high molecular weight starting polyarylene sulfide may have a low chlorine content, for instance less than about 1000 ppm, less than about 900 ppm, less than about 600 ppm, or less than about 400 ppm.

In one embodiment, the starting polyarylene sulfide may have a high molecular weight and a high melt viscosity. For instance, the melt viscosity of the starting polyarylene sulfide may be greater than about 1,500 poise, greater than about 2,500 poise, or greater than about 3,000 poise as determined in accordance with ISO Test No. 11443 at a shear rate of 1200 s$^{-1}$ and at a temperature of 310° C.

The starting polyarylene sulfide can be melt processed with a reactively functionalized disulfide compound. In general, the reactively functionalized disulfide compound may have the structure of formula (V):

$$R^3\text{—S—S—}R^4 \qquad (V)$$

wherein $R^3$ and $R^4$ may be the same or different and are hydrocarbon groups that independently include from 1 to about 20 carbons and include reactive functionality at the terminal ends of one or both of $R^3$ and $R^4$. For instance, $R^3$ and $R^4$ may be an alkyl, cycloalkyl, aryl, or heterocyclic group.

At least one of $R^3$ and $R^4$ may include a terminal carboxyl group, hydroxyl group, an amino group (either substituted or nonsubstituted), a nitro group, or the like. Examples of disulfide compounds including reactive terminal groups as may be combined with the starting polyarylene sulfide may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole), L-Cysteine, dithiobenzoic acid, dihydroxyphenyl disulfide, and 2-(4'-morpholinodithio)benzothiazole.

The amount of the disulfide compound combined with the starting polyarylene sulfide can generally be from about 0.1% to about 3% by weight of the continuous fiber composite, for instance from about 0.1% to about 1% by weight of the continuous fiber composite.

Referring again to FIG. 3, the feedstock 127 including the starting polyarylene sulfide and the reactively functionalized disulfide compound is conveyed inside the barrel 122 by the screw shaft 124 and heated by frictional forces inside the barrel 122 and by the heater 130. Upon being heated, the starting polyarylene sulfide is melted and reacts with the reactively functionalized disulfide compound to form the reactively functionalized polyarylene sulfide. The feedstock is heated to a suitable temperature to encourage this reaction. More specifically, the feedstock is heated to a temperature greater than the melting temperature of the starting polyarylene sulfide, for instance greater than about 280° C., or greater than about 300° C. The reactively functionalized polyarylene sulfide exits the barrel 122 through a barrel flange 128 and enters a die flange 132 of an impregnation die 150.

Additional components can also be included in the feedstock. For example, a polymer matrix composition can be formed that includes the reactively functionalized polyarylene sulfide in combination with one or more additives as are generally known in the art including, without limitation, impact modifiers, fillers, antimicrobials, lubricants, pigments or other colorants, antioxidants, stabilizers, surfactants, flow promoters, solid solvents, and other materials added to enhance properties and processability. Such optional materials may be employed in the polyarylene sulfide composition in conventional amounts and according to conventional processing techniques.

Additional components that may be included in a polymer composition can include additional polymers that may be blended with the polyarylene sulfide. By way of example the polyarylene sulfide can be blended with a liquid crystal polymer to form a polymer matrix composition. For example, a polymer matrix composition can include up to about 40% by weight of a liquid crystal polymer blended with the polyarylene sulfide, the reactively functionalized disulfide compound, and any other additives.

Following formation of the polyarylene sulfide composition, a plurality of continuous fibers can be embedded in the composition to form the continuous fiber composite. It should be understood that while the two processes are shown in conjunction with one another in FIG. 3, this formation method is not a requirement, and alternative formations methods are encompassed herein. For example, the polymer composition may be initially formed and the composite formation process can take place at a time or place that is removed from the composition formation process. For instance, the polymer composition can be pelletized following initial formation and stored and/or transported for later combination with the continuous fibers to form the continuous fiber composite.

According to the method of FIG. 3, a plurality of continuous fibers 142 or a plurality of continuous fiber rovings 142 are supplied from a reel or reels 144 to die 150. The rovings 142 (or continuous fibers 142 in those embodiments in which the fibers are not gathered together into the form of rovings) are generally kept apart a certain distance before combination with the polymer melt, such as at least about 4 millimeters, and in some embodiments, at least about 5 millimeters. The reactively functionalized polyarylene sulfide may further be heated inside the die by heaters 133 mounted in or around the die 150. The die is generally operated at temperatures that are sufficient to cause melting, impregnation, and adhesion of the reactively functionalized polyarylene sulfide material with the continuous fibers. Typically, the operation temperatures of the die is higher than the melt temperature of the reactively functionalized polyarylene sulfide, such as at temperatures from about 300° C. to about 450° C. When processed in this manner, the continuous fiber rovings 142 become embedded in the reactively functionalized polyarylene sulfide material. The extrudate 152 is then extruded from the impregnation die 150.

A pressure sensor senses the pressure near the impregnation die 150 to allow control to be exerted over the rate of extrusion by controlling the rotational speed of the screw shaft 124, or the federate of the feeder. That is, the pressure sensor is positioned near the impregnation die 150 so that the extruder 120 can be operated to deliver a correct amount of reactively functionalized polyarylene sulfide material for interaction with the fiber rovings 142.

Within the impregnation die 150, the ravings are traversed through an impregnation zone to impregnate the rovings with the polyarylene sulfide material. In the impregnation zone, the polyarylene sulfide material may be forced generally transversely through the rovings by shear and pressure created in the impregnation zone, which significantly enhances the degree of impregnation. This is particularly useful when forming the continuous fiber composite of a high fiber content, such as about 40% by weight of the composite or more. Typically, the die will include a plurality of contact surfaces, for instance having a curvilinear surface, to create a sufficient degree of penetration and pressure on the rovings.

To further facilitate impregnation of the rovings 142, they may also be kept under tension while present within the impregnation die. The tension may, for example, range from about 5 to about 300 Newtons, in some embodiments from about 50 to about 250 Newtons, and in some embodiments, from about 100 to about 200 Newtons per roving 142 or tow of fibers.

The impregnation die shown and described above is but one of various possible configurations that may be employed. Regardless of the technique employed, the continuous fibers are oriented in the longitudinal direction (the machine direction "A" of the system of FIG. 3) to enhance tensile strength. Besides fiber orientation, other aspects of the process are also controlled to achieve the desired strength.

Formation of the continuous fiber composite is not limited to the melt extrusion pultrusion method of FIG. 3, and the continuous fiber composite can be produced by a number of impregnation methods including, without limitation, emulsion, slurry, fiber commingling, film interleaving, and dry powder techniques.

An emulsion process can be used to form the composite by forming an aqueous emulsion including the polyarylene sulfide material having a very small particle size and applying the emulsion to the continuous fibers. For example, the polyarylene sulfide material can be milled and combined with a diluent such as water or a water-methanol mixture. A suitable methanol to water mixing ratio can be from 30/70 to 50/50 by weight. The continuous fibers can then be soaked in the emulsion and squeezed by means of squeeze rollers, etc. to encourage pickup of the polyarylene sulfide material by the fibers. The composite can then be dried, usually in a hot air drier.

Slurry coating or wet powder processing can be utilized to form the continuous fiber composite. In slurry coating, a powder including the polyarylene sulfide material can be suspended in a liquid medium, generally water, wherein no solvency exists between the resin and the medium, and the fiber bundles are drawn through the slurry. The slurry particulate matrix may not wet out the fiber, in which case high pressure can be utilized to consolidate the polyarylene sulfide material and the fibers into a composite.

To achieve intimate mixing in emulsion or slurry coating, the particle size of the slurry or emulsion can generally be smaller than the fiber diameter.

In fiber commingling, the polyarylene sulfide material is introduced in fibrous form. Specifically, fibers of the polyarylene sulfide material and the continuous fibers are mingled as dry blends and wetting of the continuous fibers by a process such as melting the polyarylene sulfide material fibers is carried out to consolidate the composite. High pressure can also be used during consolidation of the continuous fiber composite.

Film casting is another method that can be utilized in forming the continuous fiber composites. A film casting method can include first forming a film of the polyarylene sulfide composition. For example, following initial formation, the polyarylene sulfide material can be melt extruded to form a film. The continuous fibers can then be sandwiched between two films formed of the polyarylene sulfide material. The multi-layer structure can then be heated and calendered to force the resin into the fibers and form the continuous fiber composite.

Dry powder coating of continuous fibers is a relatively recent method developed in continuous fiber composite technology. This method may be advantageous in certain embodiments as no solvent is required and no high stress is introduced in the process. The ultimate goal for almost all powder coating applications is the ability to deposit a thin, even thickness, high quality coating as efficiently as possible. The polyarylene sulfide material can be solid at ambient and elevated storage temperatures, and can be capable of melting to form an adequately low viscosity material that can permit flow and to penetrate the fiber tow when heated.

In a dry powder process, substantial wet-out of the fibers by the polyarylene sulfide material can be accomplished such that the polyarylene sulfide material is liquefied sufficiently to achieve adhesion to the continuous fibers, generally without the use of a conventional adhesive or binder. Wet-out can be accomplished via a polyarylene sulfide material liquifier, such as a melter or oven, which, through heat, puts the polyarylene sulfide material into a liquid state. There are various liquifiers available, including any of the radiation or conduction ovens. Additionally, a hot die can be used in place of an oven.

As the polyarylene sulfide material is liquefied during the process, it is possible to use any size particles of the powder to coat the continuous fibers, including coarse particles. The liquefaction of the polyarylene sulfide material and the wicking of the material along the fibers can reduce the problem of coarse blending between matrix material and the fibers that is often associated with applying large diameter particles to small diameter fibers. In general, the particle size can range from the diameter or thickness of the fibers or smaller, which is the generally accepted size in the art for coating, to a diameter or thickness many times larger than that of the fibers. The use of large diameter or thickness particles of the polyarylene sulfide material can also result in significant cost savings.

To achieve substantial wet-out of the continuous fibers, sufficient residence time in the apparatus selected to put the polyarylene sulfide material in a liquid state and to allow the material to sufficiently wet-out the fibers is required. Moreover, during the wet-out stage the fibers should not be allowed to collapse laterally. This is prevented by maintaining sufficient tension on the fibers.

No matter what formation process is used to form the continuous fiber composite, due to the utilization of the reactively functionalized polyarylene sulfide and the improved adhesion with the fibers, a relatively high percentage of continuous fibers can be employed in the continuous fiber composite to provide enhanced strength properties. For instance, continuous fibers typically constitute greater than about 40%, greater than about 50% or greater than about 60% by weight of the continuous fiber composite, in some embodiments from about 40% to about 80% by weight, and in some embodiments, from about 50% to about 70% by weight of the continuous fiber composite.

The impregnated rovings can also have a very low void fraction, which helps enhance strength. For instance, the void fraction may be about 3% or less, in some embodiments about 2% or less, in some embodiments about 1% or less, and in some embodiments, about 0.5% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the polyarylene sulfide matrix, which may then be used to calculate the "void fraction" based on the following equations:

$$V_f = 100 * (\rho_t - \rho_c)/\rho_t$$

where, $V_f$ is the void fraction as a percentage;

$\rho_c$ is the density of the composite as measured using known techniques, such as with a liquid or gas pycnometer (e.g., helium pycnometer);

$\rho_t$ is the theoretical density of the composite as is determined by the following equation:

$$\rho_t = 1/[W_f/\rho_f + W_m/\rho_m]$$

$\rho_m$ is the density of the polyarylene sulfide (e.g., at the appropriate crystallinity);

$\rho_f$ is the density of the fibers;

$W_f$ is the weight fraction of the fibers; and $W_m$ is the weight fraction of the polyarylene sulfide.

Alternatively, the void fraction may be determined by chemically dissolving the polyarylene sulfide in accordance with ASTM Standard Test Method No. D 3171-09. In other cases the void fraction may be indirectly calculated based on the densities of the polyarylene sulfide, the fibers, and the continuous composite fiber in accordance with ASTM Standard Test Method No. D 2734-09 (Method A), where the densities may be determined ASTM Standard Test Method No. D792-08 Method A. Of course, the void fraction can also be estimated using conventional microscopy equipment.

Referring again to FIG. 3, the continuous fiber composite extrudate 152 may be further shaped following extrusion. For instance, the continuous fiber composite extrudate 152 may be consolidated as with rollers 190 as illustrated in FIG. 3 to form a composite tape. After leaving the impregnation die 150, the extrudate 152 may enter an optional pre-shaping, or guiding section (not shown) before entering a nip formed between two adjacent rollers 190. Although optional, the rollers 190 can help to consolidate the extrudate 152 into the desired form as well as enhance fiber impregnation and squeeze out any excess voids. In addition to the rollers 190, other shaping devices may also be employed, such as a die system.

In the illustrated embodiment, the resulting consolidated composite tape 156 is pulled by tracks 162 and 164 mounted on rollers. The tracks 162 and 164 also pull the extrudate 152 from the impregnation die 150 and through the rollers 190. If desired, the composite tape 156 may be wound up at a section 171. Generally speaking, the composite tape is relatively thin and typically has a thickness of from about 0.05 to about 1 millimeter, in some embodiments from about 0.1 to about 0.8 millimeters, and in some embodiments, from about 0.2 to about 0.4 millimeters.

It should be understood that the formation of a single, wide, consolidated composite tape is not a requirement of a formation system. In other embodiments, for example, the extrudate 152 may be further processed without the consolidation of the extrudate 152 into a tape 156. For example, upon exiting the impregnation die 150, the extrudate 152 may be wound on a roller for further processing or may be immediately processed, for example by chopping to form chips or pellets suitable for further melt processing or by direct further formation processes without first consolidating the extrudate 152 to form a composite tape 156. In another embodiment, the extrudate may be consolidated to form a plurality of relatively narrow ribbons, rather than a single wide consolidated tape as is shown in FIG. 3. In yet another embodiment, a single wide consolidated tape may be formed as illustrated in FIG. 3 and that wide tape may then be further processed to form a plurality of narrower tapes. For example, a single wide tape may be slit longitudinally to form a plurality of narrower slit tapes.

Conventional shaping processes can be used for forming articles out of the continuous fiber composite extrudate 152 including, without limitation, extrusion, injection molding, blow-molding, thermoforming, compression molding, hot-stamping and so forth. For instance thermoform sheets, injection molded or blow molded components, and the like can be formed from the continuous fiber composite extrudate 152 or from chips, pellets, etc. formed from the extrudate.

The composite tape 156 of FIG. 3 may be further shaped and processed according to a pultrusion process to form, e.g., composite rods, profiles, composite sheets, and the like. When a composite tape 156 is subsequently consolidated and shaped to form a further product, the rovings can become distributed in a generally uniform manner about a longitudinal center of the products. Such a uniform distribution can enhance the consistency of the strength properties (e.g., flexural modulus, ultimate tensile strength, etc.) over the entire length of the product.

In further shaping a continuous fiber composite from a consolidated composite tape 156, multiple composite tapes may be combined together. In general, the number of consolidated composite tapes used to form a rod, a profile, or the like will vary based on the desired thickness and strength of the product, as well as the nature of the composite tapes themselves. In certain cases, however, the number of composite tapes is from 1 to 20, and in some embodiments, from 2 to 10. The number of rovings employed in each composite tape may likewise vary. Typically, however, a composite tape will contain from 2 to 10 rovings, and in some embodiments, from 3 to 5 rovings. To help achieve symmetric distribution of the rovings in the final composite product, it is generally desired that the rovings are spaced apart approximately the same distance from each other within the composite tape. Referring to FIG. 2, for example, one embodiment of a consolidated composite tape 4 is shown that contains three (3) rovings 5 spaced equidistant from each other in the −x direction.

FIG. 4 illustrates one particular embodiment of a system and method for forming a further product from a consolidated composite tape as may be formed in a process as illustrated in FIG. 3. In this embodiment, two composite tapes 12 are initially provided in a wound package on a creel 20. The creel 20 may be an unreeling creel that includes a frame provided with horizontal rotating spindles 22, each supporting a package. A pay-out creel may also be employed, particularly if desired to induce a twist into the fibers. It should also be understood that the composite tapes 12 may also be formed in-line with the formation of the final product. In one embodiment, for example, the extrudate 152 exiting the impregnation die 150 from FIG. 3 may be directly supplied to the system used to form a product. A tension-regulating device 40 may be employed to help control the degree of tension in the composite tapes 12. The device 40 may include inlet plate 30 that lies in a vertical plane parallel to that of the rotating spindles 22 of the creel 20. The tension-regulating device 40 may contain cylindrical bars 41 arranged in a staggered configuration so that the composite tapes 12 pass over and under these bars to define a wave pattern. The height of the bars can be adjusted to modify the amplitude of the wave pattern and control tension.

The composite tapes 12 may be heated in an oven 45 before entering the consolidation die. Heating may be conducted using any known type of oven, as in an infrared oven, convection oven, etc. During heating, the fibers in the composite tapes 12 are unidirectionally oriented to optimize the exposure to the heat and maintain even heat across the entirety of the composite tapes 12. The temperature to which the composite tapes 12 are heated is generally high enough to soften the polyarylene sulfide material to an extent that the composite tapes 12 can bond together. However, the temperature is not so high as to destroy the integrity of the material. The temperature may, for example, range from about 100° C. to about 500° C., in some embodiments from about 200° C. to about 400° C., and in some embodiments, from about 250° C. to about 350° C. In one particular embodiment, for example, the composite tapes 12 are heated to or above the melting point of the reactively functionalized polyarylene sulfide, which is generally about 285° C.

Upon being heated, the composite tapes 12 are provided to a consolidation die 50 that presses them together into a preform 14, as well as aligns and forms the initial shape of the product, for instance a rod. As shown generally in FIG. 4, for example, the composite tapes 12 are guided through a flow passage 51 of the die 50 in a direction "A" from an inlet 53 to an outlet 55. The passage 51 may have any of a variety of shapes and/or sizes to achieve the final configuration. For example, the channel and product configuration may be circular, elliptical, parabolic, etc. Within the die 50, the tapes are generally maintained at a temperature at or above the melting point of the polyarylene sulfide material used in the tape to ensure adequate consolidation.

The desired heating, compression, and shaping of the composite tapes 12 may be accomplished through the use of a die 50 having one or multiple sections. For instance, although not shown in detail herein, the consolidation die 50 may possess multiple sections that function together to compress and shape the composite tapes 12 into the desired configuration.

If desired, a second die 60 (e.g., a calibration die) may also be employed that compresses the preform 14 into the final shape of the product. When employed, it is sometimes desired that the preform 14 is allowed to cool briefly after exiting the consolidation die 50 and before entering the optional second die 60. This allows the consolidated preform 14 to retain its initial shape before progressing further through the system. Typically, cooling reduces the temperature of the exterior of the formed product below the melting point temperature of the polyarylene sulfide to minimize and substantially prevent the occurrence of melt fracture on the exterior surface of the product. The internal section of the product, however, may remain molten to ensure compression when the product enters the calibration die body. Such cooling may be accomplished by simply exposing the preform 14 to the ambient atmosphere (e.g., room temperature) or through the use of active cooling techniques (e.g., water bath or air cooling) as is known in the art. In one embodiment, for example, air is blown onto the preform 14 (e.g., with an air ring). The cooling between these stages, however, generally occurs over a small period of time to ensure that the preform 14 is still soft enough to be further shaped. For example, after exiting the consolidation die 50, the preform 14 may be exposed to the ambient environment for only from about 1 to about 20 seconds, and in some embodiments, from about 2 to about 10 seconds, before entering the second die 60. Within the die 60, the preform is generally kept at a temperature below the melting point of the polyarylene sulfide so that the shape of the product can be maintained. Although referred to above as single dies, it should be understood that the dies 50 and 60 may in fact be formed from multiple individual dies (e.g., face plate dies).

In addition to the use of one or more dies, other mechanisms may also be employed to help compress the preform 14 into the shape of the product. For example, rollers (not shown) may be employed between the consolidation die 50 and the calibration die 60 to further compress the preform 14 before it is converted into its final shape. The rollers may have any configuration, such as pinch rollers, overlapping rollers, etc.

If desired, the resulting product may also be applied with a capping layer to protect it from environmental conditions or to improve wear resistance. Referring again to FIG. 4, for example, such a capping layer may be applied via an extruder oriented at any desired angle to introduce a thermoplastic resin into a capping die 72. Suitable thermoplastic polymers for the capping layer may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), acrylic polymers, polyvinyl chloride (PVC), etc.

When employed in certain applications, such as electric transmission cables, the capping layer may help prevent a galvanic response. In such embodiments, it is typically desired that the capping material has a dielectric strength of at least about 1 kilovolt per millimeter (kV/mm), in some embodiments at least about 2 kV/mm, in some embodiments from about 3 kV/mm to about 50 kV/mm, and in some embodiments, from about 4 kV/mm to about 30 kV/mm, such as determined in accordance with ASTM Testing Method No. D149-09. Particularly suitable high dielectric strength capping layer materials may include polyketone (e.g., polyetherether ketone ("PEEK")), polysulfide (e.g., polyarylene sulfide), or a mixture thereof.

Referring again to FIG. 4, a pulling device 82 is positioned downstream from the cooling system 80 that pulls the finished product 16 through the system for final sizing of the composite. The pulling device 82 may be any device capable of pulling the product through the process system at a desired rate. Typical pulling devices include, for example, caterpillar pullers and reciprocating pullers.

One embodiment of a rod formed from the method described above is shown in more detail in FIG. 5 as element 516. As illustrated, the rod 516 has a generally circular shape and includes a core 514 formed from one or more consolidated tapes. By "generally circular", it is generally meant that the aspect ratio of the rod cross section (height divided by the width) is typically from about 1.0 to about 1.5, and in some embodiments, about 1.0. Due to the selective control over the process used to impregnate the rovings and form a consolidated tape, as well the process for compressing and shaping the tape, the rod is able to possess a relatively even distribution of a polyarylene sulfide material across along its entire length. This also means that the continuous fibers are distributed in a generally uniform manner about a longitudinal central axis "L" of the rod 516. As shown in FIG. 5, for example, the core 514 includes continuous fibers 526 embedded within a thermoplastic matrix 528. The fibers 526 are distributed generally uniformly about the longitudinal axis "L." It should be understood that only a few fibers are shown in FIG. 5, and that the rod will typically contain a substantially greater number of uniformly distributed fibers.

A capping layer 519 optionally extends around the perimeter of the core 514 and defines an external surface of the rod 516. The cross-sectional thickness of the core 514 may be strategically selected to help achieve a particular strength. For example, the core 514 may have a cross sectional thickness (e.g., diameter) of from about 0.1 to about 40 millimeters, in some embodiments from about 0.5 to about 30 millimeters, and in some embodiments, from about 1 to about 10 millimeters. The thickness of the capping layer 519 depends on the intended function of the part, but is typically from about 0.01 to about 10 millimeters, and in some embodiments, from about 0.02 to about 5 millimeters. Regardless, the total cross-sectional thickness or height of the rod typically ranges from about 0.1 millimeters to about 50 millimeters, in some embodiments from about 0.5 millimeters to about 40 millimeters, and in some embodiments, from about 1 millimeter to about 20 millimeters. While the rod may be substantially continuous in length, the length of the rod is often practically limited by the spool onto which it will be wound and stored or the length of the continuous fibers. For example, the length often ranges from about 1000 to about 5000 meters, although even greater lengths are certainly possible.

As will be appreciated, the particular rod embodiment described above is merely exemplary of the numerous products that may be formed with the continuous fiber composite. For instance, other pultrusion products such as profiles of any shape, e.g., U-shaped, V-shaped, hollow tubes or pipes, ellipses, etc. can be formed.

As discussed above, the continuous fiber composites can also be utilized in melt processing formation processes such as injection molding, blow molding, thermoforming, extrusion, compression molding, hot-stamping and the like including combinations of melt processing formation methods to form a component.

In one embodiment, composite tapes, ribbons, sheets, panels, and the like can be utilized as reinforcing materials for conduits and containers such as tubular members including pipes, pipe lines, and storage tanks. Tubular members formed to include the composite materials can be useful, for example, in carrying fluids, such as heated liquids and/or gases. For example, tubular members can be useful in forming gas and oil pipelines.

A tubular member that incorporates the polyarylene sulfide continuous fiber composite can be, e.g., a multi-layered tubular member. FIG. 6 illustrates a multi-layered tubular member 610 as may incorporate the continuous fiber composite in one or more layers of the tubular member. For example, at least the inner layer 612 can include the continuous fiber composite.

The outer layer 614 and the intermediate layer 616 can include a continuous fiber composite that is the same or different than the continuous fiber composite described herein. Alternatively, other layers of the multilayer tubular member may be formed of different materials. For example, in one embodiment the intermediate layer 616 can exhibit high resistance to pressure and mechanical effects. By way of example, layer 616 can be formed of polyamides from the group of homopolyamides, co-polyamides, their blends or mixtures which each other or with other polymers. Alternatively, layer 616 can be formed of the continuous fiber composite as described herein and the inner layer 612 can be formed of a different polyarylene sulfide composition that can exhibit high resistance to chemical and/or high temperature degradation.

Outer layer 614 can provide protection from external assaults as well as provide insulative or other desirable characteristics to the tubular member. For example, a multi-layer tubular member can include an outer layer 614 formed from a rubber material having high levels of chipping, weather, flame and/or cold resistance. Examples of such materials include thermoplastic elastomer such as polyamide thermoplastic elastomer, polyester thermoplastic elastomer, polyolefin thermoplastic elastomer, and styrene thermoplastic elastomer. Suitable materials for outer layer 614 include, without limitation, ethylene-propylene-diene terpolymer rubber, ethylene-propylene rubber, chlorosulfonated polyethylene rubber, a blend of acrylonitrile-butadiene rubber and polyvinyl chloride, a blend of acrylonitrile-butadiene rubber and ethylene-propylene-diene terpolymer rubber, and chlorinated polyethylene rubber.

Outer layer 614 can alternatively be formed of a harder, less flexible material, such as a polyolefin, polyvinylchloride, or a high density polyethylene, a fiber reinforced composite material such as described herein, or a metal material such as a steel jacket.

Of course, a multi-layer tubular member is not limited to three layers, and may include two, four, or more distinct layers. A multi-layer tubular member may further contain one or more adhesive layers formed from adhesive materials such as, for example, polyester polyurethanes, polyether polyurethanes, polyester elastomers, polyether elastomers, polyamides, polyether polyamides, polyether polyimides, functionalized polyolefins, and the like.

Multilayer tubular members may be made by conventional processes, such as, for example, co-extrusion, dry lamination, sandwich lamination, coextrusion coating, and the like. By way of example, in forming a three-layered tubular member 610 as illustrated in FIG. 6, one or more layers of the multilayered tubular member can be formed from a continuous tape of the continuous fiber composite. A tape can be wrapped to form the tubular member or one or more layers of the multilayered tubular member according to known practices as are generally known in the art.

The continuous fiber composite may be used to form other single- or multilayered containers including bags, bottles, storage tanks and other containers such as may be produced by extrusion, extrusion blow molding, injection blow molding, stretch blow molding, or other conventional processes for forming such articles. By way of example, tubular members including conduits and/or storage tanks as may be utilized for carrying and/or storing oil, natural gas, water, and so forth, can be wrapped with one or more layers of a continuous fiber composite as described herein. The wrapping can impart increased structural support to the underlying container, for instance in order to improve the burst pressure characteristics of the container. Utilization of the continuous fiber composites in such a fashion can provide a route to the formation of lighter weight pipes and storage tanks while maintaining or even increasing the strength characteristics of the structures.

Products that can beneficially incorporate the continuous fiber composite can include those in which a plurality of individual tapes or sheets may be overlaid with one another to form a panel. One or more of the individual tapes or sheets may be formed of the composite and the tapes or sheets may be overlaid such that the continuous fibers of adjacent sheets are either aligned with one another or are at an angle to one another, rather than aligned with one another. A plurality of panels can be stacked together with the longitudinal direction of the continuous fibers of each adjacent panel varying with respect to one another. The stack of panels can then be hot stamped so as to adhere the adjacent panels to one another and to shape the composite. The resulting composite material can be quite strong with the continuous fibers imparting good strengthening characteristics in multiple directions. Such composite materials can beneficially be utilized in transportation applications. By way of example, overlaid continuous carbon fiber composite panels can be utilized in forming structural components as may be utilized in vehicles including, without limitation, satellites and other aerospace applications, aircraft, automobiles, bicycles, ships and wheel chairs.

The continuous fiber composites are useful in other applications such as sporting goods, including skis, skate boards, bicycles, and so forth. Other potential uses for the composite materials can include body armor, turbine blades, helicopter rotors and the like. Continuous fiber composites can also provide structural support in buildings, bridges and other infrastructure, for instance when utilized in conjunction with concrete.

The present disclosure may be better understood with reference to the following examples.

EXAMPLE 1

Testing Methods

Flexural properties were determined according to ASTM Test Method No. D790-03. According to the test method, a bar of rectangular cross section rests on two supports and is loaded by means of a loading nose midway between the supports. A supported span-to-depth ration of 16:1 is used. The specimen is deflected until rupture occurs in the outer surface of the test specimen or until a maximum strain of 5.0% is reach, whichever occurs first. Procedure A is employed that utilizes a strain rate of 0.01 mm/mm/min, the support and nose radius was 5 millimeters, the support span was 3.68 inches, and the test speed was 0.1 inches per minute.

Tensile properties were determined according to ASTM Test Method No. D3039/D3039M-08. According to the test method, a thin flat strip of material having a constant rectangular cross section is mounted in the grips of the mechanical testing machine an monotonically loaded in tension while recording the force. The ultimate strength of the material can be determined from the maximum force carried before failure. If the coupon strain is monitored with strain or displacement transducers then the stress-strain response of the material can be determined, from which the ultimate tensile strain, tensile modulus of elasticity, poison's ration, and the transition strain can be derived.

Short-Beam strength was determined according to ASTM Test Method No. D2344/D2344M-00. According to the test method, the Short-beam test specimens are center Loaded. The specimen ends rest on two supports that allow lateral motion, the load being applied by means of a loading nose directly centered on the midpoint of the specimen.

Specimen Formation

Carboxylic acid functionalized polyphenylene sulfide was formed by reaction of polyphenylene sulfide with 2,2-dithiosalicylic acid (DTSA). Continuous fiber tapes were initially formed using an extrusion system as substantially described above and shown in FIGS. 3-4. Carbon fiber rovings (Torayca® T700S-50C 12k available from Toray Carbon Fibers America, Inc.) were employed for the continuous fibers with each individual tape containing three (3) fiber rovings. Polyphenylene sulfide resin (Fortron® 0214 or 0203 linear polyphenylene sulfide available from Ticona Engineering Polymers of Florence, Ky.) and 2,2-dithiosalicylic acid (DTSA) were fed to the extruder.

As a control, a polyphenylene sulfide (Fortron® 0205 linear polyphenylene sulfide available from Ticona Engineering Polymers of Florence, Ky.) was added to the extruder with no functionalized disulfide component. The tapes were formed with either 60% by weight of the composite carbon fiber loading (control and sample 1) or 67% by weight of the composite carbon fiber loading (sample 2). Sample no. 4 included a liquid crystal polymer (LCP, Zenite® 5000 available from DuPont Corporation) in a blend with the polyphenylene sulfide, and Sample No. 5 included an impact modifier (Lotader® AX8840—a random copolymer of ethylene and glycidyl methacrylate available from Arkema, Inc.). The resulting tapes had a thickness of between 0.2 to 0.4 millimeters and a void fraction of less than 1%.

Samples formed are described in Table 1, below. The carbon fiber amounts are provided as weight percentage of the tape sample and the polyphenylene sulfide (PPS), functionalized disulfide (DTSA), liquid crystal polymer (LCP) and impact modifier amounts are provided as weight percentages of the polyarylene sulfide composition component of the tape sample.

TABLE 1

Formulation of the samples

| Sample No. | Carbon fiber | PPS | DTSA | LCP | Impact Modifier |
|---|---|---|---|---|---|
| 1 | 60 | 100 (0205) | — | — | — |
| 2 | 60 | 99.2 (0214) | 0.8 | — | — |
| 3 | 67 | 99.2 (0214) | 0.8 | — | — |
| 4 | 60 | 79.4 (0214) | 0.6 | 20 | — |
| 5 | 60 | 98 (0203) | — | — | 2 |

Once formed, multiple tapes of each sample were then fed to a pultrusion line operating at a speed of 15 feet per minute. Prior to consolidation, the tapes were heated within an infrared oven (power setting of 445). The heated tapes were then supplied to a consolidation die, such as described above and shown in FIG. 4. The die contained a rectangular-shaped channel that received the tapes and consolidated them together. Within the die, the tapes remained at a temperature of about 371° C., which is just above the melting point of the polyphenylene sulfide matrix. Upon consolidation, the resulting laminate was then briefly cooled with an air ring/tunnel device that supplied ambient air at a pressure of 8.5 psi. The laminate was then passed through a nip formed between two rollers, and then to a calibration die for final shaping. Within the calibration die, the laminate remained at a temperature of about 82° C. The resulting part was then supplied to several sizing blocks (or dies) to impart the final solid rectangular shape and cooled using a water tank at a temperature of about 7° C. The profile had a thickness of 5.87 millimeters and a width of 19.94 millimeters.

Results

Both the individual tapes and the laminate panel were subjected to testing. Results of testing are shown in FIGS. 7-14 and Tables 2-4, below. As can be seen, the tensile properties of the carbon fiber tapes were enhanced with the carboxylic acid functional polyphenylene sulfide as compared to the control. The mechanical properties of the panels formed from the carboxylic acid functionalized polyphenylene sulfide showed better tensile, flexural and short beam shear properties.

TABLE 2

Tensile property of the tapes

| Sample | Carbon fiber loading % | Peak Stress (ksi) | St Dev. | % strain @ peak load | St. Dev. | CHORD modulus (Mpsi) | St. Dev. |
|---|---|---|---|---|---|---|---|
| 1 | 60 | 307.5 | 24.5 | 1.73 | 0.16 | 15.85 | 1.50 |
| 2 | 60 | 321.9 | 27.0 | 1.71 | 0.19 | 17.13 | 1.51 |
| 3 | 67 | 295.4 | 31.7 | 1.53 | 0.26 | 17.45 | 2.01 |

TABLE 3

Tensile properties of the panels

| Sample | Carbon fiber loading % | Peak Stress (ksi) | St Dev. | % strain @ peak load | St. Dev. | Tensile strength (ksi) | St. Dev. | CHORD modulus (Mpsi) | St. Dev. |
|---|---|---|---|---|---|---|---|---|---|
| 1 | 60 | 272.5 | 9.2 | 1.84 | 0.10 | 272.4 | 9.0 | 14.68 | 0.74 |
| 2 | 60 | 307.8 | 11.5 | 1.80 | 0.03 | 308.0 | 11.7 | 16.22 | 0.53 |
| 3 | 67 | 321.2 | 28.4 | 1.83 | 0.09 | 321.0 | 28.6 | 18.13 | 1.22 |

TABLE 4

3-point flexural properties of the panels

| Sample | Carbon fiber loading % | Max Flex Load (lbf) | St Dev. | Flex Stress (ksi) | St. Dev. | Chord Modulus (Mpsi) | St. Dev. | Flex Strain (%) | St. Dev. |
|---|---|---|---|---|---|---|---|---|---|
| 1 | 60 | 138.4 | 4.8 | 167.8 | 4.9 | 15.7 | 0.2 | 1.80 | 0.04 |
| 2 | 60 | 147.7 | 5.9 | 172.6 | 7.1 | 15.7 | 0.1 | 1.12 | 0.05 |
| 3 | 67 | 175.1 | 12.8 | 175.5 | 11.1 | 17.1 | 0.6 | 1.03 | 0.04 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A continuous fiber tape extending in a longitudinal direction, wherein the tape comprises rovings formed from continuous fibers oriented in the longitudinal direction, wherein the rovings are embedded within a polyarylene sulfide matrix, wherein the matrix includes a functionalized linear polyphenylene sulfide comprising a carboxyl functionality, wherein the functionalized linear polyphenylene sulfide has cross-linking units in an amount of no more than about 1 mol.% and is formed by melt processing a linear polyphenylene sulfide with a carboxyl functionalized disulfide compound, wherein the reactively functionalized polyphenylene polyarylene sulfide has a melt viscosity of less than about 1,500 poise as determined in accordance with ISO Test No. 11443 at a shear rate of 1200 s$^{-1}$ and at a temperature of 310°C., and further wherein the continuous fiber tape.

2. The continuous fiber tape of claim 1, wherein the continuous fibers constitute greater than about 50% by weight of the continuous fiber tape.

3. The continuous fiber tape of claim 1, wherein the functionalized polyphenylene sulfide has a chlorine content of less than about 1000 ppm.

4. The continuous fiber tape of claim 1, wherein the continuous fiber tape has a tensile stress of greater than about 2140 MPa as determined in accordance with ASTM testing method number D3039/D3039M-08.

5. The continuous fiber tape of claim 1, wherein the continuous fiber tape has a tensile modulus of greater than about 117×10$^3$ MPa inch as determined in accordance with ASTM testing method number D3039/D3039M-08.

6. The continuous fiber tape of claim 1, wherein the continuous fibers are glass fibers, quartz fibers, silica fibers, ceramic fibers, boron fibers, silicon carbide fibers, metal oxide fibers, carbon fibers, metal fibers, inorganic crystal fibers, organic polymer fibers, or a combination thereof.

7. A pultruded tape, sheet, rod, or profile comprising the continuous fiber tape of claim 1.

8. A laminated panel comprising the continuous fiber tape of claim 1.

9. The laminated panel of claim 8, wherein the laminated panel has at least one of the following characteristics:

a tensile stress of greater than about 2050 MPa as determined according to ASTM testing method number D3039/D3039M-08;

a tensile strength of greater than about 2065 MPa as determined according to ASTM testing method number D3039/D3039M-08; and a short beam shear strength of greater than about 410×10$^3$ MPa.

10. A tubular member comprising the continuous fiber tape of claim 1.

11. The continuous fiber tape of claim 1, wherein the disulfide compound is dithiosalicyclic acid, dithioglycolic acid, α-α-dithiodilactic acid, β-βdithiodilactic acid, dithiobenzoic acid, or a combination thereof.

12. The continuous fiber tape of claim 1, wherein the disulfide compound is dithiosalicyclic acid, dithiobenzoic acid, or a combination thereof.

13. The continuous fiber tape of claim 1, wherein the continuous fibers include carbon fibers.

14. The continuous fiber tape of claim 1, wherein the tape has a void fraction of about 3% or less.

15. The continuous fiber tape of claim 1, wherein the tape contains from 2 to 10 rovings.

16. A rod comprising the continuous fiber tape of claim 1.

17. The rod of claim 16, wherein the rod contains a core and a capping layer, the core containing the continuous fiber tape.

18. An electrical transmission cable comprising the rod of claim 16.

* * * * *